Dec. 29, 1931.  F. R. NELSON  1,838,859
TRANSMISSION
Filed April 2, 1931    2 Sheets-Sheet 1

Dec. 29, 1931.  F. R. NELSON  1,838,859
TRANSMISSION
Filed April 2, 1931   2 Sheets-Sheet 2
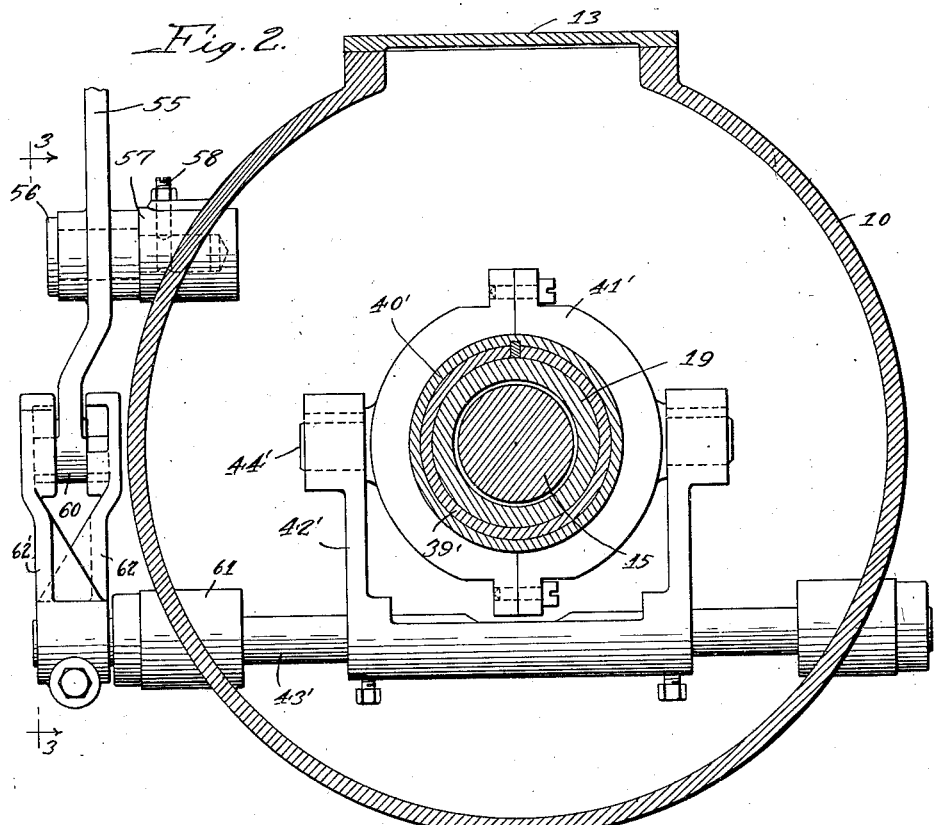
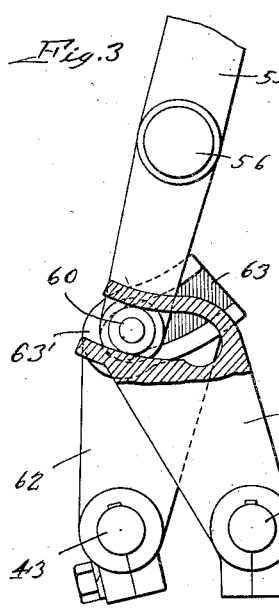
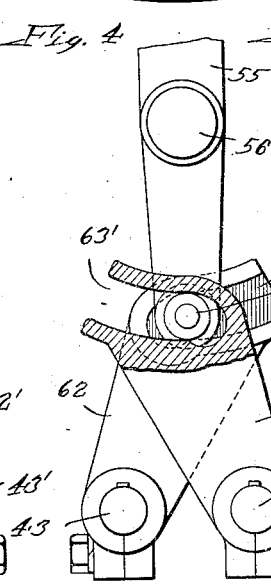
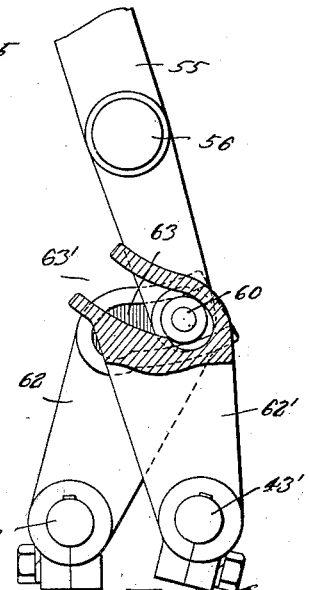
Inventor
By Floyd R. Nelson Patented Dec. 29, 1931

1,838,859

UNITED STATES PATENT OFFICE

FLOYD R. NELSON, OF ROCKFORD, ILLINOIS, ASSIGNOR TO COTTA TRANSMISSION CORPORATION, OF ROCKFORD, ILLINOIS, A CORPORATION OF ILLINOIS

TRANSMISSION

Application filed April 2, 1931. Serial No. 527,083.

This invention relates to power transmissions generally, and has special reference to one designed for marine purposes, but adapted for use wherever it is desired to have a forward and reverse drive.

The principal object of my invention is to provide a transmission of this kind of simpler, more compact and economical construction than has been available in the past, a salient feature of which is the use of constantly meshed planetary gears and a friction clutch and brake, the clutch when engaged to lock the sun gear to the flywheel for forward drive and the brake serving when engaged to hold the same stationary for reverse drive. This eliminates entirely the necessity of bringing gears into mesh or engaging jaw clutches and makes for smoother and quiet operation.

Another object consists in the provision of over center or toggle means to insure positive engagement or disengagement of the clutch and brake devices, and also the provision of cam levers controlling the positions of the throw-out collars, the same being so designed as to positively lock either device in the disengaged condition while the other device is engaged.

The invention is illustrated in the accompanying drawings in which—

Fig. 2 is a cross-section on the line 2—2 of Fig. 1;

Fig. 3 is a sectional detail on the line 3—3 of Fig. 2; and

Figs. 4 and 5 are views similar to Fig. 3 but showing the parts in two other positions.

The same reference numerals are applied to corresponding parts throughout the views.

Figure 1:
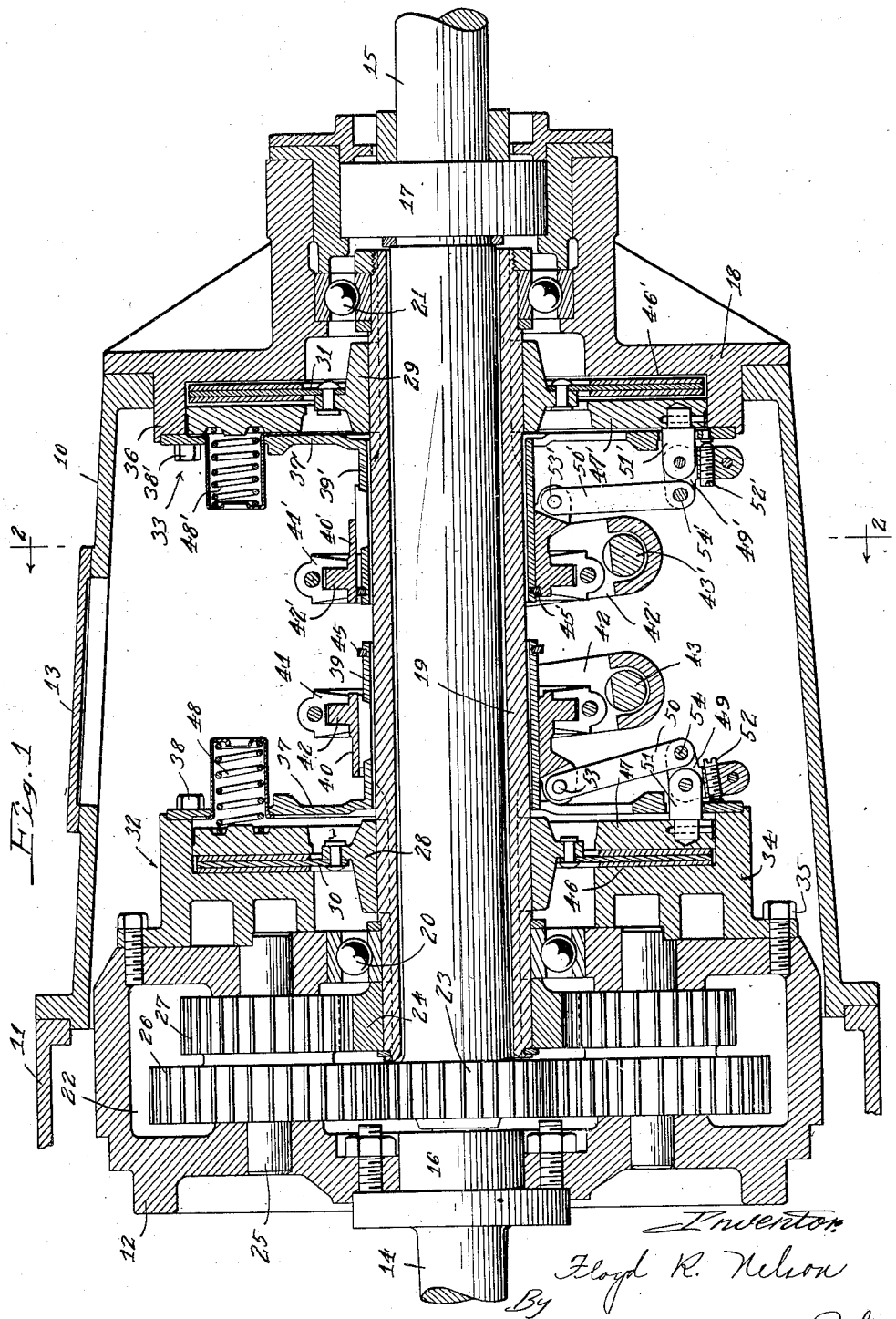
Figure 1 is a longitudinal vertical section through a transmission made in accordance with my invention.

The transmission is contained in a housing 10 suitably secured onto the back of the housing 11 of the flywheel 12. An inspection plate 13 on the housing 10 affords access to the clutch and brake devices for inspection. The flywheel 12 is mounted on the end of the crank shaft 14 of the internal combustion engine in connection with which the transmission is used, and, of course, any suitable type of engine or prime mover may be used. The driven shaft 15 extending from the housing 10 has the forward end thereof received in a pilot bearing 16 at the center of the flywheel, and another bearing 17 is provided for the shaft at the rear end of the housing. A casting 18 forms the rear wall of the housing and has the bearing 17 mounted therein as shown. A sleeve 19 fits freely about the shaft 15 between the flywheel 12 and casting 18 and is received in anti-friction ball bearings 20 and 21 mounted in those parts. The flywheel 12 is formed so as to provide a housing 22 therein for planetary gearing of which one sun gear 23 is fixed on the front end of the shaft 15 and another sun gear 24 is splined on the front end of the sleeve 19. Pins 25 are mounted in the flywheel to mount sets of planet gears 26 and 27 thereon in clusters, the planet gear 26 of each cluster meshing with the sun gear 23 and the planet gear 27 of each cluster meshing with the sun gear 24. Two clusters of planet gears are shown, but it will of course, be evident that more could be provided if desired, so long as they are in equally circumferentially spaced relation. The sleeve 19 has the centers 28 and 29 of two discs 30 and 31 splined on the opposite ends thereof adjacent the bearings 20 and 21, respectively. The disc 30 forms a part of a clutch indicated generally by the reference numeral 32 and the disc 31 a part of a brake designated generally by the reference numeral 33. The clutch 32 has its housing 34 fixed to the flywheel 12, as appears at 35, to turn therewith, whereas the brake 33 has its housing 36 formed as an integral part of the casting 18 so as to be a fixed member. Therefore, when the clutch 32 is engaged the gear 24 is locked to the flywheel to turn therewith but when the brake 33 is engaged the gear 24 is held stationary with the housing 36. The clutch 32 is, therefore, the "forward" clutch because its engagement means the locking of the planetary gearing with the flywheel for the turning of the sun gear 23 and the shaft 15 with it with the flywheel. The brake 33, on the other hand, is responsible for "reverse" drive because its engagement means the holding of the sun gear 24 stationary and the revolving of the planet gears 27 thereon and the consequent driving of the other sun gear 23 in the opposite direction from that of the flywheel by the planet gears 26 meshing therewith. The gear ratios are such that when the brake 33 is engaged to hold the sun gear 24 stationary the sun gear 23 drives the propeller shaft 15 at the same speed as the crank shaft 14 but in the opposite direction.

The clutch 32 and brake 33 are of substantially identical construction so that a description of the one device will serve for both but to avoid confusion in the numbering, while reference is made to the clutch 32 the same numbers primed will apply to the corresponding parts of the brake 33. The back plate 37 of the clutch 32 is suitably bolted to the clutch housing, as at 38, and has an enlarged elongated hub 39 projecting outwardly therefrom through which the sleeve 19 extends freely. A throw-out collar 40 is slidably but non-rotatably mounted on the hub 39 and has a two-piece ring 41 fitting over the annular flange 42 provided thereon whereby to communicate movement to the collar when the ring 41 is given movement through the agency of a yoke 42 oscillated by means of a rock shaft 43. In Fig. 2, the yoke 42' of the brake 33 clearly appears and it will be observed that its connection with the ring 41' is through the medium of trunnions 44' projecting from the halves of the ring and received in the arc. The clutch 32 is arranged to be disengaged, as will soon appear, by outward movement of the throw-out collar 40 on the hub 39, and a split ring 45 limits the movement in that direction. The marginal portions of the clutch disc 30 are provided with facings for good frictional engagement with the face 46 in the clutch housing on one side and with the pressure plate 47 on the other side. Springs 48 acting between the back plate 37 and the pressure plate 47 normally tend to hold the clutch engaged. Bell crank levers 49 are arranged, however, to cooperate with links 50 connected to the throw-out collar 40 to retract the pressure plate 47 against the action of the springs 48 to disengage the clutch. The posts 51 projecting from the pressure plate through guide openings in the back plate provide pivotal mountings for the levers 49, and adjusting screws 52 on the levers 49 engage the outside of the back plate to afford fulcrums for the levers on the back plate. The links 50, of which there are usually three, in equally circumferentially spaced relation about the throw-out collar 40, are pivoted to the collar at 53 and to the levers 49 at 54, and when the throw-out collar is moved toward the pressure plate enough to bring the pivots 53 past a dead center plane running through the pivots 54 the pressure of the springs 48 becomes effective to engage the clutch, in which condition the clutch 32 is shown in Fig. 1. However, when the throw-out collar is moved away from the back plate enough to bring the pivots 53 on the other side of the dead center plane through the pivots 54 the pressure of the springs 48 becomes effective to hold the clutch disengaged, the equivalent of that condition being illustrated by the brake 33 in Fig. 1. In the disengagement of the clutch, the throw-out collar must have its movement limited by the ring 45; otherwise the collar would be allowed to move off the hub and the clutch would become engaged. The clutch 32 and brake 33 are, in other words, held engaged under spring pressure when engaged and held disengaged under spring pressure when disengaged. The use of devices of this kind, which are known as over center spring loaded clutches, is particularly desirable in a transmission of the kind herein contemplated, because, when the one device is engaged, the other device must be definitely disengaged, and vice versa. The manually operable clutch control mechanism which will now be described is, furthermore, so constructed as to positively insure that the one device will remain disengaged so long as the other is engaged, and vice versa.

The clutch 32 and brake 33 are jointly controlled by a single hand lever 55 pivotally mounted on a pin 56 received in a boss 57 formed on the side wall of the housing 10. A set screw 58 in the boss 57 is arranged to enter an annular groove provided in the pin 56 to fasten the pin and the lever thereon in place. A crosshead 60 is suitably formed on the lower end of the lever at a predetermined radius with respect to the pivot 56 as by means of a crosspin, on which rollers are preferably provided. The pivot 56, as clearly appears in Figs. 3—5, is substantially midway between the centers of the rock shafts 43 and 43', the positions of which determine the engagement and disengagement of the clutch 32 and brake 33, respectively. The shafts 43 and 43' are received in bearings 61 provided in the side walls of the housing 10 and project therefrom sufficiently for the mounting thereon of levers 62 and 62'. The levers are of substantially identical form having arcuate cam grooves or slots 63 and 63', respectively, formed in the free ends thereof but it will be seen that the levers are so disposed that the groove 63 on the lever 62 faces the groove 63' in the lever 62' whereby to receive the opposite ends of the crosshead 60 therein. The grooves 63 and 63' are struck on an arc of the same radius as that described by the crosshead 60 in the oscillation of the lever 55. Both of these grooves are inclined upwardly away from the shafts 43 and 43' so that the shafts 43 and 43' associated with the two levers 62 and 62', respectively, are in neutral position holding both of the devices 32 and 33 disengaged when the lever 55 is standing substantially vertical, as appears in Fig. 4. However, when the lever is swung in a clockwise direction to the position shown in Fig. 3, the shaft 43 is given a slight counterclockwise movement by the lever 62 but there is no movement communicated to the shaft 43′ by the lever 62′. Consequently, the clutch 32 is engaged but the brake 33 is left disengaged. If, on the other hand, the lever 55 is given counterclockwise movement from the position shown in Fig. 4 to that shown in Fig. 5 the shaft 43 remains in its neutral position but the shaft 43′ is given a slight clockwise movement by the lever 62′. Consequently, the brake 33 is engaged but the clutch 32 is left disengaged. It should be manifest from examination of Figs. 3 and 5 that when the lever 55 is moved either way from its mid position, the neutral position, it communicates movement to one of the levers 62 and 62′ and holds the other lever against movement.

The operation of the transmission is believed to be clear from the foregoing description. When the hand lever 55 is in mid position the clutch 32 and brake 33 are both disengaged and there is no power transmitted from the drive shaft 14 to the driven shaft 15. When forward drive is desired the lever 55 is swung in a clockwise direction as viewed in Fig. 3 to engage the clutch 32, leaving the brake 33 disengaged. This locks the sun gear 24 with the flywheel 12 so that the planetary gearing in the flywheel is locked to turn as a unit with the flywheel, thereby driving the shaft 15 at the same speed as the shaft 14 and in the same direction. Forward drive is stopped by simply moving the lever 55 back to the neutral position shown in Fig. 4, thereby disengaging the clutch 32. Then reverse drive can be secured by moving the lever 55 in a counterclockwise direction as viewed in Fig. 5, this movement securing the engagement of the brake 33 and leaving the clutch 32 disengaged. With the brake 33 engaged the sun gear 24 is held against turning, being locked to the casting 18 forming a part of the transmission housing 10. The planet gears 27 in the turning of the flywheel are turned on their axes 25 by meshing with the sun gear 24, and the planet gears 26 turn with them and transmit drive to the sun gear 23 to drive the shaft 15 in the opposite direction from the shaft 14 but at the same speed, by reason of the particular gear ratios provided for. It is obvious that a slower reverse drive is obtainable by simply providing a larger sun gear 23 and smaller planet gears 26. The operation of the transmission is smooth and quiet owing to the fact that there are no gears turning in forward drive and no gears to be engaged in securing reverse drive, the gears used for that drive being in constant mesh. Furthermore, the present transmission by reason of its friction devices used for both forward and reverse drive is free from the objection of clashing that went with the use of jaw clutches.

The appended claims have been drawn with a view to covering all legitimate modifications and adaptations.

I claim:

1. In a power transmission, the combination of a housing, a driven shaft extending from said housing, a driving shaft coaxially disposed with respect to the driven shaft, a flywheel on the end of the driving shaft in said housing, two sets of planet gears mounted in clusters on the flywheel, a sun gear on the driven shaft meshing with one set of the planet gears, a second sun gear meshing with the other set of said planet gears, a clutch on the flywheel arranged when engaged to lock the second sun gear to turn with the flywheel, a brake arranged when engaged to hold the second sun gear stationary with the housing, and means for selectively engaging either the clutch or brake, the last mentioned means comprising a pair of rock shafts, the oscillation of which is arranged to cause engagement and disengagement of the clutch and brake, said shafts being disposed alongside one another substantially in parallelism, a pair of levers mounted on said shafts having the free ends thereof reaching toward each other and disposed in laterally spaced relation, a hand lever pivotally mounted between the shafts and beyond the ends of said levers for oscillation with the end thereof reaching between the ends of said levers, a crosshead on the end of said hand lever, and cam slots provided in the free ends of said levers for reception of the opposite ends of said crosshead, said slots both being arcuate in form and corresponding to the arc described in the movement of the crosshead in the oscillation of said hand lever, and said slots being so disposed with respect to one another whereby in the movement of said crosshead in one direction from a mid position the one lever is moved but the other held stationary, and vice versa.

2. In a power transmission, the combination of a housing, a driven shaft extending from the housing, a driving shaft coaxially disposed with respect to the driven shaft, a flywheel on the driving shaft in said housing, two sets of planet gears mounted in clusters on the flywheel, a sun gear on the inner end of the driven shaft meshing with the one set of planet gears, a sleeve fitting freely over the driven shaft in said housing and extending from the flywheel, a second sun gear on the end of said sleeve meshing with the other set of planet gears, a clutch on the flywheel to lock the sleeve to turn with the flywheel, a brake on the housing to hold the sleeve stationary with the housing, and means for selectively engaging either the clutch or brake, the last mentioned means comprising a pair of rock shafts, the oscillation of which is arranged to cause engagement and disengagement of the clutch and brake, said shafts being disposed alongside one another substantially in parallelism, a pair of levers mounted on said shafts having the free ends thereof reaching toward each other and disposed in laterally spaced relation, a hand lever pivotally mounted between the shafts and beyond the ends of said levers for oscillation with the end thereof reaching between the ends of said levers, a crosshead on the end of said hand lever, and cam slots provided in the free ends of said levers for reception of the opposite ends of said crosshead, said slots both being arcuate in form and corresponding to the arc described in the movement of the crosshead in the oscillation of said hand lever, and said slots being so disposed with respect to one another whereby in the movement of said crosshead in one direction from a mid position the one lever is moved but the other held stationary, and vice versa.

3. In a power transmission, the combination of a housing, a flywheel in said housing, a suitably supported driving shaft for turning the flywheel, a driven shaft extending from the housing through a bearing in the wall thereof, the inner end of said shaft having a pilot bearing on the flywheel, a sleeve fitting freely over the shaft in said housing and having a bearing at one end on the aforesaid housing wall and at the other end on the flywheel, two sets of planet gears mounted in clusters on the flywheel, a sun gear on the driven shaft meshing with one set of planet gears, a second sun gear on the end of the sleeve meshing with the other set of planet gears, a friction clutch and a friction brake, the clutch comprising a disc fixed on one end of the sleeve for cooperation with a surface on the flywheel and having means for engaging the same with said surface to turn with the flywheel, the brake also comprising a disc fixed on the other end of the sleeve for cooperation with a surface on the housing wall, and having means for engaging the same with said surface to hold the same stationary with the housing, and means for selectively engaging either the clutch or brake.

4. A power transmission as set forth in claim 3 wherein the last mentioned means comprises a pair of rock shafts, the oscillation of which is arranged to cause engagement and disengagement of the clutch and brake, said shafts being disposed alongside one another substantially in parallelism, a pair of levers mounted on said shafts having the free ends thereof reaching toward each other and disposed in laterally spaced relation, a hand lever pivotally mounted between the shafts and beyond the ends of said levers for oscillation with the end thereof reaching between the ends of said levers, a crosshead on the end of said hand lever, and cam slots provided in the free ends of said levers for reception of the opposite ends of said crosshead, said slots both being arcuate in form and corresponding to the arc described in the movement of the crosshead in the oscillation of said hand lever, and said slots being so disposed with repect to one another whereby in the movement of said crosshead in one direction from a mid position the one lever is moved but the other held stationary, and vice versa.

5. In a power transmission, the combination of a housing, a flywheel in said housing, a suitably supported driving shaft for turning the flywheel, a driven shaft extending from the housing through a bearing in the wall thereof, the inner end of said shaft having a pilot bearing on the flywheel, a sleeve on the shaft in said housing between the aforesaid housing wall and the flywheel, two sets of planet gears mounted in clusters on the flywheel, a sun gear on the driven shaft meshing with one set of planet gears, a second sun gear on the end of the sleeve meshing with the other set of planet gears, a friction clutch and a friction brake, the clutch comprising a disc fixed on the sleeve adjacent the flywheel for cooperation with a surface on the flywheel, and over center means for engaging or disengaging the disc with said surface, the brake also comprising a clutch disc for cooperation with a surface on the housing wall, and over center means for engaging said disc with said surface, and means for selectively engaging either the clutch or brake.

6. In a power transmission, the combination with a pair of parallel rock shafts each of which is arranged when turned to control the transmission of power to a driven shaft, of a pair of levers mounted on said shafts having the free ends thereof reaching toward each other and disposed in laterally spaced relation, a hand lever pivotally mounted between the shafts and beyond the ends of said levers for oscillation with the end thereof reaching between the ends of said levers, a crosshead on the end of said hand lever, and cam slots provided in the free ends of said levers for reception of the opposite ends of said crosshead, said slots both being arcuate in form and corresponding to the arc described in the movement of the crosshead in the oscillation of said hand lever, and said slots being so disposed with respect to one another whereby in the movement of said crosshead in one direction from a mid position the one lever is moved but the other held stationary, and vice versa.

In witness of the foregoing I affix my signature.

FLOYD R. NELSON.